United States Patent [19]

Ninh et al.

[11] Patent Number: 5,705,860
[45] Date of Patent: Jan. 6, 1998

[54] INFLIGHT ENTERTAINMENT SYSTEM HAVING EMI AND ESD IMPROVEMENTS

[75] Inventors: Loi Ninh, Foothill Ranch; Gerald Lester, Costa Mesa, both of Calif.

[73] Assignees: Sony Corporation, Tokyo, Japan; Sony Trans Com, Irvine, Calif.

[21] Appl. No.: 625,470

[22] Filed: Mar. 29, 1996

[51] Int. Cl.⁶ .................................. H04N 7/18; H04B 3/28
[52] U.S. Cl. .......................... 307/91; 307/9.1; 348/820; 348/837
[58] Field of Search ........................ 307/9.1, 10.1, 307/89–91; 174/35 MS, 35 R; 312/7.2; 348/8, 840, 837, 819, 820; 297/188.05; 361/212, 216, 816, 818; 315/8, 85; 313/313, 479

[56] References Cited

U.S. PATENT DOCUMENTS

| | | | |
|---|---|---|---|
| 4,663,670 | 5/1987 | Ito et al. | 348/820 |
| 4,835,604 | 5/1989 | Kondo et al. | 348/8 |
| 4,853,791 | 8/1989 | Ginther, Jr. | 348/819 |
| 4,866,515 | 9/1989 | Tagawa et al. | 348/8 |
| 5,000,511 | 3/1991 | Shichijo et al. | 297/188.05 |
| 5,094,513 | 3/1992 | Fukuda | 312/7.2 |
| 5,096,271 | 3/1992 | Portman | 312/7.2 |

OTHER PUBLICATIONS

H. Schlicke, *Electromagnetic Compossibility–Applied Principles of Cost–Effective Control of Electromagnetic Interference and Hazards*, 2d.ed, 1982, p. xiii–xxvi.

B. Audone, *Electromagnetic Compatibility–Interference and Immunity in Equipment and Systems*, McGraw–Hill, 1993, pp. 148–154.

R. Pritchard et al., *A Comparison of the Susceptibility Performance of Shielded and Unshielded Twisted Pair Cable for Data Transmission*, IEEE, 1992, pp. 236–242.

R. Stoner, *Impact of the Use of Commerical off–The–Shelf Equipment On the Requirements for Electromagnetic Interference (EMI) Control*, IEEE 1992, pp. 518–519.

Primary Examiner—Richard T. Elms
Attorney, Agent, or Firm—Charles M. Fish, Esq.; Jerry A. Miller

[57] ABSTRACT

A vehicle passenger information system, for example an inflight entertainment system, has a combination of improvements for reducing electromagnetic interference ("EMI") and electrostatic discharge ("ESD"). A microprocessor based system controller has a system controller chassis with a first conductive EMI shield layer, a low impedance aircraft chassis ground path directly electrically connected to the shield layer and to controller components. Additionally, a display unit has a chassis with a second conductive EMI shield layer enclosing a plurality of PCBs directly electrically connected to the shield layer. The display unit supports are grounded through a plurality of system connectors penetrating the display chassis and a low impedance display unit ground path directly electrically connects the two shield layers. A method of decreasing the EMI and ESD susceptibility of, and the levels of radiated EMI from, a vehicle entertainment system is also provided.

5 Claims, 4 Drawing Sheets

INFLIGHT ENTERTAINMENT SYSTEM HAVING EMI AND ESD IMPROVEMENTS

FIELD OF THE INVENTION

This invention relates to inflight entertainment systems and more particularly to a combination of improvements for reducing electromagnetic interference ("EMI") and electrostatic discharge ("ESD") and method for doing the same.

BACKGROUND

Airline inflight entertainment systems commonly installed aboard modern passenger aircraft provide increased passenger comfort as well as a revenue stream to airlines through making available a number of entertainment options. Well known systems such as those shown for example in U.S. Pat. Nos. 4,866,515 (Tagawa et al), 4,835,604 (Kondo et al), 5,000,511 (Shichijo et al), and 5,096,271 (Portman) disclose a number of methods of providing audio and video inflight entertainment to airline passengers. It is also well known that aircraft passengers are increasingly occupying their time with other electronic devices such as computers, electronic games and personal stereo systems. In addition, airlines are providing additional passenger communication options such as inflight phones, as well as increasing the aircraft's own electronic communication and navigation systems to improve safety of flight. It will be appreciated that the rapid proliferation of all these electronic devices could lead to severe problems if not actively managed.

As a result, airline passengers are aware that they are unable to use many of their personal electronic devices during take-off and landing/approach situations when the electromagnetic emissions from these devices could be potentially harmful. In response to the potential for electromagnetic interference, several government and manufacturer specifications exist requiring the levels of electromagnetic emissions in aircraft to be maintained at particularly low levels. Standards such as MILSPEC 461\462, Boeing specification DO 160C, MacDonald Douglas specification WZZ7000, the European standard IEC955 and various FAA regulations control operation characteristics of inflight electronic systems.

Although controlling EMI is an ongoing problem, the existence of standards does not either provide a means of meeting the standards or suggest specific solutions in actual inflight environments. For example, existing standards for screening enclosures (such as MIL STD 285) are concerned with the field attenuation of a screening enclosure. They do not address the problem of inductive coupling to interior circuits from RF currents flowing in the screen. The transfer impedance of a screening enclosure is an important parameter, whether it is electrically large or electrically small. To screen the enclosed circuits all enclosures must have adequately low transfer impedance.

In fact, experienced commentators have indicated that the rigid military developed format of minimum standards for electromagnetic interference or electromagnetic compatibility ("EMC") is exactly the wrong approach to an incredibly complex and situation specific discipline. See, H. Schlicke, *Electromagnetic Compressibility*, Introduction (Marcel Dekker: New York 2d Ed. 1982). Additionally, the existence of standards does not require their attainment. In fact, failure to correct a problem may be remedied through obtaining a variance from the FAA, an aircraft manufacturer and/or an airline, allowing a unit to remain out of specification.

Another problem which is significant both given the operating environment of an inflight entertainment system and the increasing complexity of such systems including their reliance on more complex integrated circuits, is the phenomenon of electrostatic discharge ("ESD"). ESD can damage circuits in several ways:

Arcing from the discharge path to circuitry,
Induction of differential-mode voltage in circuit loops due to passage of ESD current through an equipment's ground structure, and
Surface charging of ungrounded circuit elements that can lead to arcing and/or upset of some semiconductors.

The first cause is almost always destructive, and the third cause is sometimes destructive. Therefore, during equipment design and bench testing engineers usually attempt to address such problems. Elimination of upsets due to differential-mode induction is more difficult; these upsets are seldom destructive, but, rather, the resulting digital system "hangups" are usually removed by powering the system down, and then back up. Aircraft specific ESD problems are, of course, very difficult to eliminate at the bench, and can often arise during, or as a result of, system installation.

Although methods of controlling EMI and ESD have been known for quite awhile, the problem has become more significant in the recent past in view of the increase in complexity of onboard electronic systems, the decrease in space and weight allotted to such systems and the increase in passenger generated EMI. Moreover, given the complexity of the time/frequency domain interaction between various circuits, the complexity of the various fields generated and the related lack of adequate predictability deriving from models of these fields, EMI suppression has often been viewed as "black magic." In fact, the most frequent prior approach to controlling EMI has been to follow generally accepted (although often under-analyzed) principles during system design and then to redesign the system as necessary for its specific environment. Even the most modern modeling techniques have not reduced the need for an essentially trial and error approach to EMI and EMC engineering. See, generally, A. Brattacharyya, *High Frequency Electromagnetic Techniques: Recent Advances and Applications* (New York: Wiley Interscience Publications 1995). This approach is obviously both time and resource intensive and does not lend itself to efficient production of EMI hardened systems. As discussed in the commentary noted above, the proliferation of specifications and systems has not done anything to decrease this problem. Moreover, particularly onboard an aircraft; grounding can also be difficult, especially in view of the temperature and mechanical vibration stresses placed on equipment and enclosures by the airborne environment.

Known methods of protecting systems from potentially hazardous EMI and ESD, as well as meeting FAA and manufacturers' specifications, have included enclosing systems within metal containers, adding ferrite beads to cables where they penetrate device enclosures, and generally attempting to shorten wire lengths. "Folk wisdom" has also suggested rules of thumb relating to which components should be separated as widely as possible. However, as discussed, standard approaches have often been less than efficient or successful.

Therefore, it is one object of the present invention to provide a simplified systematic approach to EMI and ESD improvements at the design stage for inflight entertainment systems. More generally, it is desirable to provide a predetermined simplified combination of EMI and ESD suppression techniques which can be implemented to achieve other design criteria such as decreased weight, smaller size and increased number of entertainment options for passengers. In addition, it is desirable to decrease the cost of installation and maintenance of inflight entertainment systems through avoiding expensive re-engineering of systems for each platform or even airframe in which they are installed. In fact, it is highly desirable and a specific objective of the current invention to provide a EMI/ESD improved system, both in terms of susceptibility and in terms of radiated levels, which is extremely difficult to degrade or defeat through improper or inattentive installation or maintenance procedures.

SUMMARY OF THE INVENTION

The present invention provides an inflight entertainment system having a combination of improvements for reducing electromagnetic interference ("EMI") and electrostatic discharge ("ESD"). It is an object of the present invention to provide a microprocessor based system controller, a system controller chassis having a first conductive EMI shield layer and housing a plurality of PCBs within said system chassis; a low impedance aircraft chassis ground path directly electrically connected to said first shield layer; at least one display unit, a display unit chassis having an interior surface substantially entirely coated with a second conductive EMI shield layer and housing a further plurality of PCBs directly electrically connected to said second shield layer; a metallic bracket support attached to said display unit; a plurality of system connectors penetrating said display chassis and electrically connected to said bracket and said second shield layer; and a low impedance display unit ground path directly electrically connecting said second shield layer to said first shield layer.

In other embodiments, the invention further incorporates playback devices similarly connected to the controller chassis shield, shielded cabling and a similarly shielded and grounded smart video display unit for addressing the various display units.

Another embodiment of the present invention involves a method of decreasing the EMI and ESD susceptibility of an inflight entertainment system.

BRIEF DESCRIPTION OF THE DRAWINGS

The present invention is illustrated by way of example, and not by way of limitation, in the figures of the accompanying drawings in which like reference numerals refer to similar elements and in which.

DESCRIPTION OF THE INVENTION

A method and apparatus for achieving improved EMI and ESD performance in an inflight entertainment system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

This description will focus on the EMI and ESD improvements applicable to, for example, an aircraft inflight entertainment system. It will not focus on details of operation of such a system, which are fully disclosed, for example, in the aforementioned United States patents describing a variety of entertainment delivery systems suitable for passengers in transportation vehicles. Thus, for example, it is believed that details such as the scheme for multiplexing signals and/or addressing protocols for a variety of terminals are well within the skill of those in the presentation media art and need not be described here.

Figure 1:
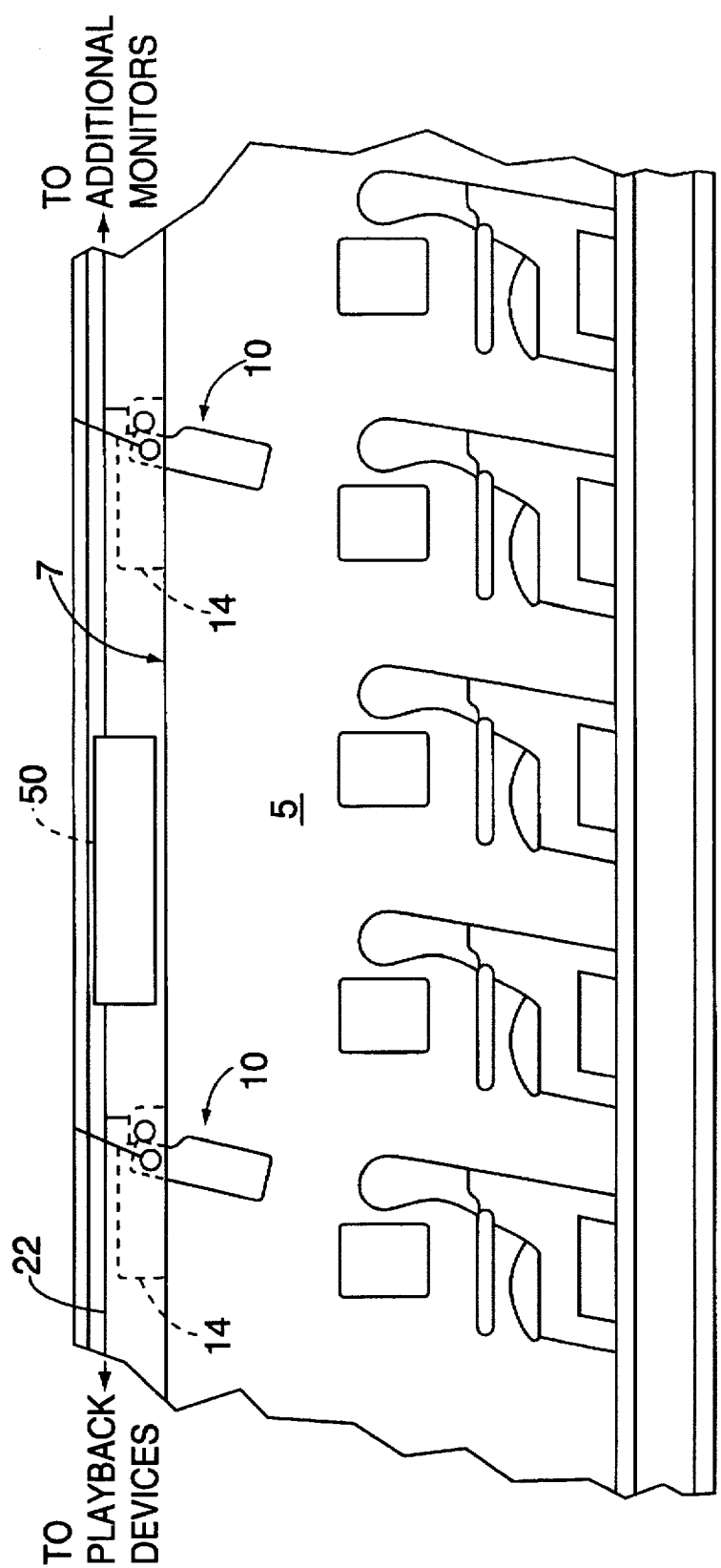
FIG. 1 depicts an inflight entertainment system adapted for use with the present invention.

FIG. 1 depicts a section of a known aircraft inflight entertainment system. An aircraft passenger cabin 5 has an overhead 7 and a number of passengers seats. Display units 10, for example television monitors, are supported by a frame structure 14 having brackets 17 (not shown) attaching to aircraft structural members and enabling the retraction of display units 10 into overhead 7 when desired. Modern inflight entertainment systems contain a variety of playback devices (not shown) such as video cassette decks, tape decks, laser disc players and the like, under control of microprocessor-based control circuitry here generically shown as controller 50 mounted in a convenient location such as inside the overhead. Conductors, in the form of standard cabling and connectors, here depicted generically as cable 22, connect the system allowing the flow of power, command signals, entertainment content signals, and grounding the system to the airframe or aircarft chassis. In such a system, a variety of entertainment options can be provided such as several movies or TV programs simultaneously with full stereo sound and audio-only programming as well. It will be appreciated that a number of monitors, for example arrayed in a number of user-selectable sections or groups are included in such systems. An example of a system for which this invention is particularly suited is the 8.6 inch LCD SlimLine™ system sold by Sony Trans Com of Irvine, Calif. It will be appreciated, of course, that other systems both on and off aircraft could also utilize the current invention.

Figure 2:
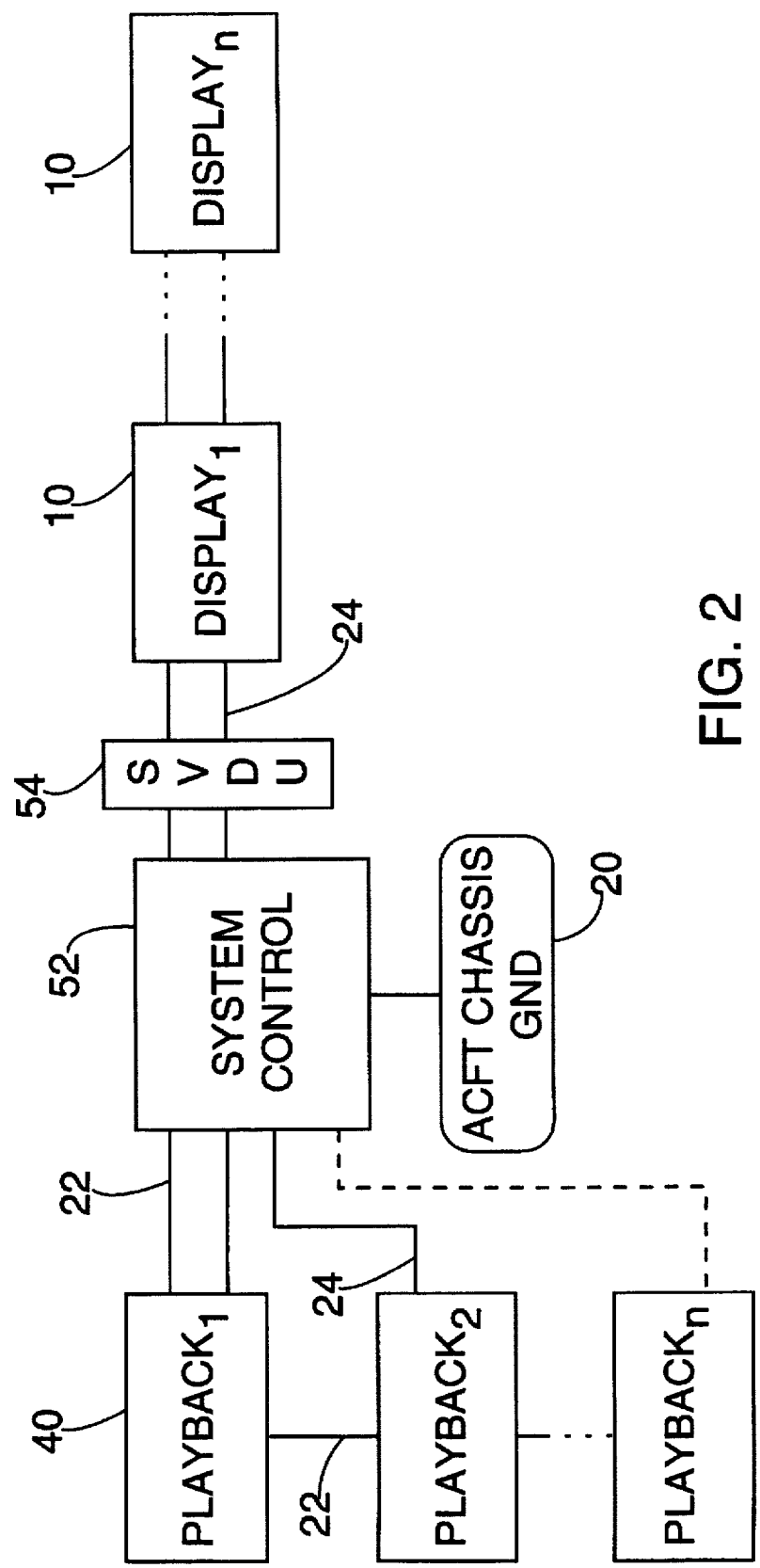
FIG. 2 depicts a functional description of an inflight entertainment system incorporating one embodiment of the present invention.

FIG. 2 depicts a system utilizing the current invention in block form. A number of display units 10 (here indicated as display 1 through display n) are connected by cables 24 and 22 via a smart video display unit 54 to a system controller 52. For the purposes of illustration, the number of cables are limited to two, 22 indicating a signal pathway which may in actuality include several types of connections such as full duplex control, video, audio signals and the like. Pathway 24 is intended to indicate a dedicated ground line connecting the elements of the system ultimately to aircraft chassis ground 20. To provide entertainment content, a variety of playback units 40 (indicated as playback 1, playback 2 through playback n) may be operatively connected to the system controller. Again, only two connections are shown to emphasize the current invention, a signal pathway 22 and a ground pathway 24.

The smart video display unit 54 functions to distribute signals to the variety of display units 1 through display units 10 1-N and to amplify signals and route these units. In a preferred embodiment, this unit maintains addresses for the display units and serves to switch and direct control and content signals as necessary. The major functional components of the system are commercially available from, for example, Sony Trans Com Corporation in Irvine, Calif. when dealing with an aircraft inflight entertainment embodiment of the present invention. In other situations, suitable playback control devices and display devices and wiring and connections are believed to be within the skill of those in the art from a wide array of commercially available products. "Content playback devices (such as VCRs, laser disc players, CD players and other magnetic and optical players), like other vehicle electronics, and especially avionics, are routinely carefully shielded and grounded. Although commercially available players typically have metal cases which serve as adequate shields, shields of the types discussed herein, such as nonconducting plastic with an interior integral shield layer, are acceptable."

It will be appreciated that the display and playback devices could be connected in a variety of methods without departing from the sense of the instant invention. Thus, for example, the playback units could be centrally located at an aircraft video control center or could be spread throughout the vehicle. Similarly, displays could be connected serial, in parallel or combinations. The provision of a single ground is, however, significant. In terms of susceptibility, when for example, a system element is placed in the vicinity of EMI producing devices such as speakers in the passenger cabin, it is important in terms of performance that the ground path be improved as is provided through the instant invention. In addition to avoiding interference from other sources, which is known as decreasing system susceptibility, and avoiding affecting other systems (or decreasing radiated EMI), it is significant to note that arrangements such as the present invention actually result in noticeably improved picture quality.

Figure 3:
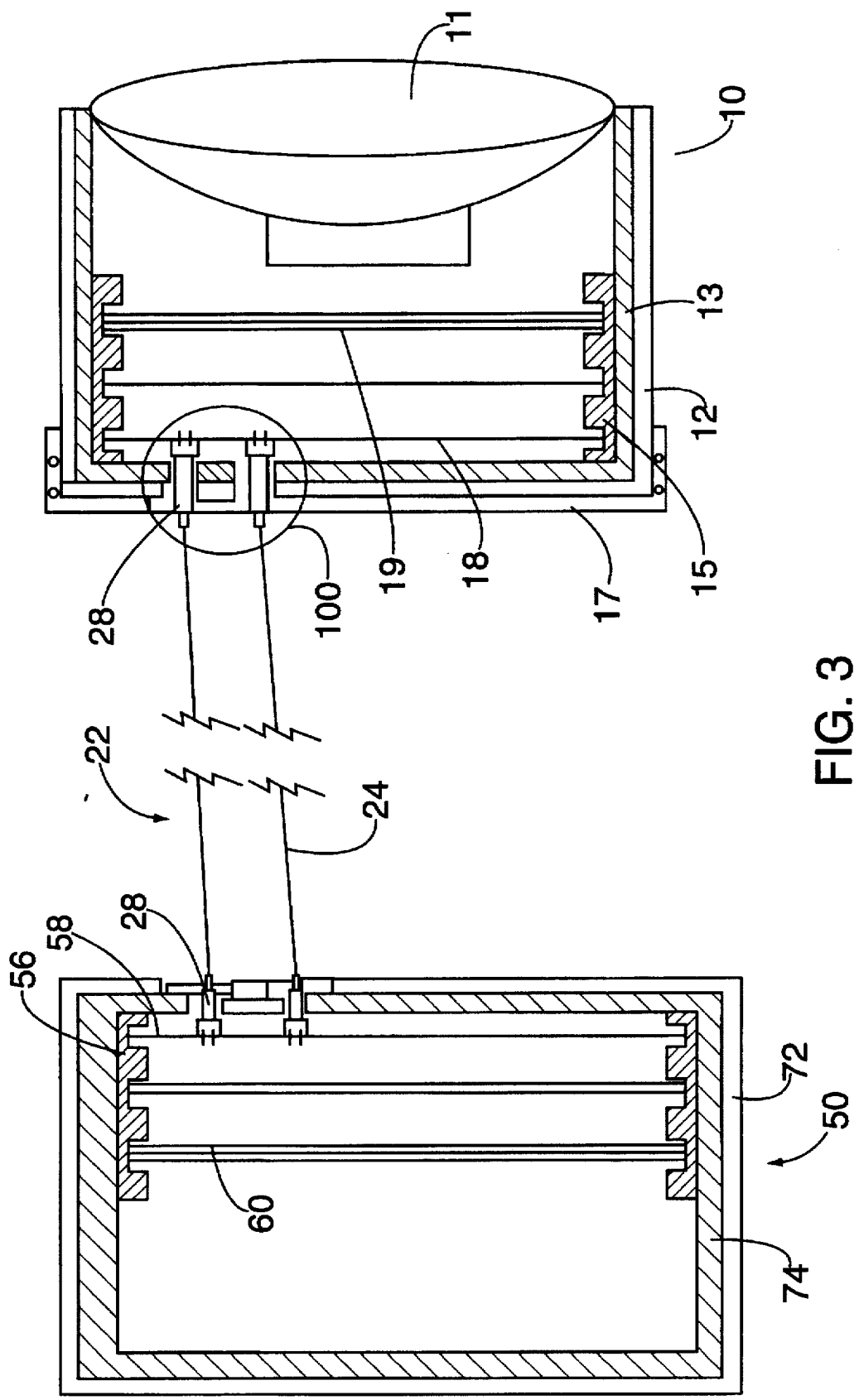
FIG. 3 depicts a cutaway top view of a system controller and single display unit incorporating one embodiment of the present invention.

Turning to FIG. 3, a simplified cutaway top view of the combination of improvements of the present invention is depicted. Display unit 10 has a display screen 11, for example a liquid crystal display or other video monitor. Preferably, although not depicted in this drawing, the display screen or device itself is able to be moved between a variety of positions in which passengers can view the entertainment and in which the display device is stored in a protected condition. Especially in an aircraft configuration, it is desirable to have the display unit supported by a metallic bracket 17 adapted for attachment to the airframe structural elements. An example of a preferred mounting and display device rotating arrangement is disclosed in the aforementioned Portman U.S. Pat. No. 5,096,271. Display unit 10 has a nonconductive chassis 12 preferably formed in a number of sections for ease of assembly and disassembly. Most preferably, display unit chassis 12 should be carefully fitted with tabs and overlapping flanges so that when it is closed a tight seal can be maintained even in a high vibration mechanical stress environment. The inside surface of display unit chassis 12 is provided with a shielding coating 13.

Modern display and system control units often have plastic housings because of the lower price and weight, and greatly improved design flexibility, result in better eye appeal and thus salability of the end product. But plastic enclosures are pervious to EMI, and many designers surprisingly forget this. The plastic housing itself can be made electrically shielded by two methods: conductive coating or conductive plastic.

Conductive coating can be provided in quite a variety of ways, to be decided upon by the number of pieces to be shielded and by their complexity: metal foil or tape, ion plating, spray plating, vacuum metallizing, cathode spraying, electroless plating, flame spraying. Most metallic paints are not conductive, hence, such are worthless in EMI/ESD applications.

Another option for displayment and system controller housings is conductive plastics (composite materials containing metal flakes or metallized fibers). These can be economical and still provide sufficient shielding (40 dB or so). There is, however, at least one drawback at present: the surface layer of such composite materials is predominantly plastic, hence an insulator. This impediment, unless properly corrected by molding-in metal inserts or grinding off the nonconductive surface layer, has two very bad effects:

(1) No contacts where contacts are needed for shield continuity (joints, shielded windows, etc.); and (2) The high surface resistivity does not bleed off static electricity, which can kill transistors or solid state memories. The addition of carbon black may reduce the surface resistivity sufficiently. In Europe, the surface resistivity is mandated to be less than $10^9$ ohm per square; however, no corresponding standard exists in the United States.

Finally, housing openings need to be carefully designed, as will be appreciated by those of skill in the EMC art, and leakage controlled through known techniques such as gaskets, shielded windows and the like. The preferred conductive coating for housing internal shields of this invention is copper conducting paint from Spraylat Corporation of Mt. Vernon, N.Y.

To securely house the various circuit elements found in display unit 10, and provide a secure low impedance ground path, conductive card guides 15 are provided. Most preferably, the guides provide friction fitting slots for printed circuit boards, both of the single and multi-board construction type indicated by FIGS. 18 and 19, and are directly electrically connected to the shielding layer 13.

A plurality of connectors 28 penetrate the display unit chassis and attach to a printed circuit board 18 which is in turn connected to card guide 15 and shield 13. The connectors are, for illustrative purposes, shown connected to pathways 22 for entertainment and control signals and 24 providing a ground path. It will be appreciated that the method of connection here is merely illustrative and a number of methods of connecting a plurality of display units 10 to the system controller would be easily achievable by one of skill in the art. For example, rings with nodes branching off them might be implemented, as might other types of connectors. It is believed that optoelectric connectors (such as LEDs and fiber optics) would not be optimum, despite their obvious EMI advantages, in view of interface and connection design problems, and most significantly installation and maintenance difficulties inherent in such systems. It is to be remembered that a key feature of the present invention is the provision of a system in which EMI and ESD difficulties arising from installation and maintenance are significantly decreased.

Continuing in FIG. 3, connections or pathways 22 and 24 lead from display unit 10 to system controller 50. Connectors 28 of type similar to those previously discussed, directly interface with a circuitboard, here 58, on penetrating the system controller chassis. Like the previously discussed display unit chassis, the system controller chassis is preferably constructed of a nonconductive material such as a high impact plastic. Selection of such materials is believed to be well within the skill of those skilled in the art.

Analogously to the display unit chassis discussed above, system controller chassis 50 has an external nonconducting portion 72 and an internal surface substantially entirely coated with a shield layer of the sort discussed above. It will be appreciated that the surface may not be entirely coated, as, for example, viewing ports or ventilation may be required both in the display unit chassis and in the system controller chassis. However, as discussed above, it is well known how to maintain shielding in the presence of such minimal enclosure penetrations, and thus their description is not believed to be essential to the present invention.

As discussed above, both multi-layer PCBs 60 and single layer PCBs 58 are intended to accommodated by conductive card guide 56. Although card guides 56 and 15 are indicated as slot-type card guides, a number of constructions could be adopted, including various card gripping fingers or flanges, pin and hole arrangements, detent structures and the like. It is especially preferred in the present invention to position conductive card guides along the top of the system controller 50 chassis such that when the chassis is assembled into an enclosed state, the cards are frictionally fitted into and against the conductive card guides to produce a vibration resistant and electrically robust ground path.

Figure 4:
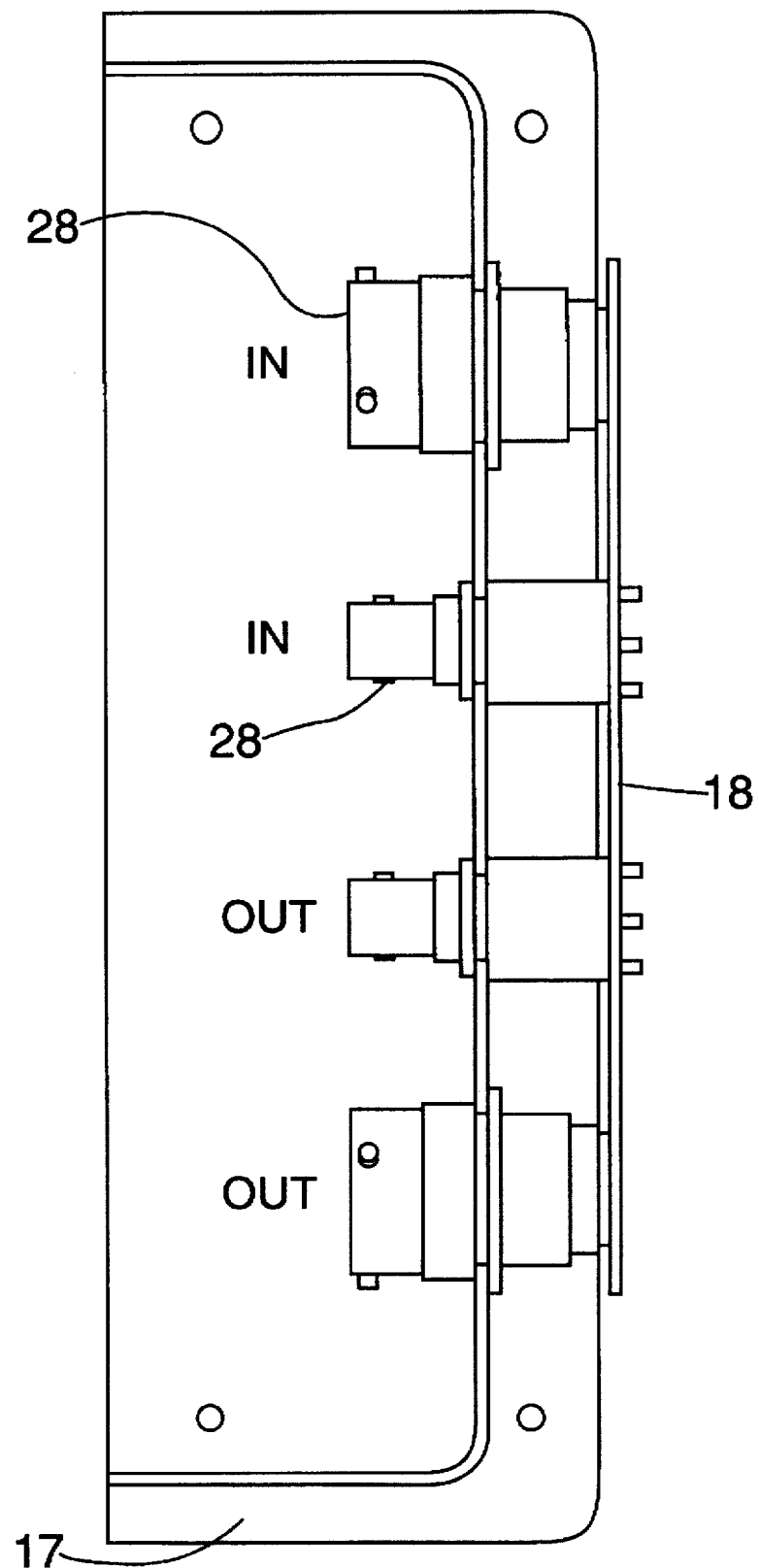
FIG. 4 is a view of a preferred display unit connector arrangement in accordance with the present invention.

Turning to FIG. 4, a preferred arrangement of connectors 28 for penetrating the display unit 10 chassis shown in bubble 100 in FIG. 3 are shown. Bracket 17 is provided to mechanically support the display unit 10 from, for example, the airframe structural members, while allowing display screen 11 to be movably positioned for optimum passenger entertainment. Connectors 28 pierce and make electrical contact with bracket 17 and terminate in circuitboard 18 to provide a low impedance path to ground for stray electrostatic charges which may develop and otherwise would be isolated or insufficiently removed in bracket 17, support 14 and the like. As has been mentioned, it is an important goal of this invention to provide a low impedance ground path for the system.

It will be appreciated by those of skill in the an that low impedance is a phrase having significance in the context of a given circuit or application. Depending on parameters such as clock and data rates, rise and fall times, and especially frequencies used, various conductors can, of course, be low or not very low impedance paths. For example, braided conductors often used for grounding straps exhibit significant impedance at frequencies above 1 Mhz. Similarly, in a given system application, various conductors can be understandably identified as low impedance relative to that circuit's parameters.

The combination of EMI and ESD features provided by the present invention are ideal for use in any application that requires providing entertainment or information without increasing the operating environment's electromagnetic noise or losing information signals in a noisy environment. For example, entertainment or multimedia systems provided for passenger use in ships and busses could benefit from use of the present invention. More generally, any system for displaying information to the public could find this invention applicable. Aircraft inflight entertainment systems have been used as an example of a field which would benefit significantly from the present invention. However, the present invention is not limited to any specific field of use.

While specific embodiments of the present invention have been described, various modifications and substitutions are within the scope of the present invention, and are intended to be covered by the following claims.

What is claimed is:

1. An improved aircarft inflight entertainment system comprising:
   a microprocessor based system controller enclosed in a system controller chassis, said system controller chassis having at least two interconnectable nonconductive sections, each section having an inside and an outside surface, said inside surfaces substantially entirely coated with a first conductive electromagnetic interference ("EMI") shield layer;

a plurality of printed circuit boards ("PCBs") housed within said system chassis, said system controller PCBs each incorporating internal ground planes directly electrically connected to said first shield layer;

an entertainment system low impedance aircraft chassis ground path directly electrically connected to said first shield layer;

a display unit having a display unit chassis, said display unit chassis having at least two interconnectable non-conductive sections, each section having an interior and an exterior surface, said interior surface substantially entirely coated with a second conductive EMI shield layer;

a plurality of PCBs housed within said display unit chassis, said display unit PCBs incorporating internal ground planes directly electrically connected to said second shield layer;

a metallic bracket attached to and movably supporting said display unit;

a plurality of connectors penetrating said display chassis and electrically connected to said bracket and said second shield layer; and a low impedance display unit ground path directly electrically connecting said second shield layer to said first shield layer.

2. The system of claim 1 further comprising at least one playback device having a playback device chassis, said playback device operatively connected to said system controller and said display unit.

3. The system of claim 2 further comprising shielded cabling connecting said playback device to said system controller and said display unit; wherein said playback device chassis is connected by a single low impedance path to said first shield layer and thereby coupled to an aircraft chassis ground.

4. An improved vehicle passenger entertainment system comprising:
   means for controlling said system including a microprocessor;
   playback means for providing entertainment content under direction of said controlling means;
   first means for shielding said controlling means from ambient and system originated electromagnetic interference ("EMI") and electrostatic discharge ("ESD");
   means for suppressing and removing EMI and ESD originated within said first shielding means;
   means for displaying said entertainment to passengers, including means for supporting said display means in positions viewable by said vehicle passengers;
   second means for shielding said display means from ambient and system originated EMI and ESD;
   means for suppressing and removing EMI and ESD from said second shielding means and said supporting means;
   means for directly electrically coupling said first and second shielding means together and to a vehicle chassis ground; and
   means for separately connecting said controlling, playback and displaying means.

5. A method of decreasing electromagnetic interference ("EMI") and electrostatic discharge ("ESD") susceptibility of, and radiated from, a vehicle passenger entertainment system having controlling, playback and displaying means, each of said means equipped with separate integral internal shielding means, said system further including display supporting means, the method comprising the steps of:

provide entertainment content under direction of said controlling means;

shielding said controlling means from ambient and system originated EMI and ESD via first shielding means;

suppressing and removing EMI and ESD from said controlling means;

displaying said entertainment to passengers, including movably supporting said display means in positions viewable by said vehicle passengers;

shielding said displaying means from ambient and system originated EMI and ESD via second shielding means;

suppressing and removing EMI and ESD from said second shielding means and said supporting means;

directly electrically connecting said first and second shielding means together and to a common system vehicle chassis ground; and separately connecting said controlling, playback and displaying means.

* * * * *